United States Patent [19]

Nishizawa et al.

[11] Patent Number: 4,992,876
[45] Date of Patent: Feb. 12, 1991

[54] NOISE REDUCTION CIRCUIT FOR AN IMAGING AND RECORDING APPARATUS WITH AN MOS SOLID-STATE IMAGING DEVICE

[75] Inventors: Shigeki Nishizawa, Mobara; Toshio Miyazawa, Chiba; Iwao Takemoto; Tetsuro Izawa, both of Mobara, all of Japan

[73] Assignee: Hitachi, Ltd., Tokyo, Japan

[21] Appl. No.: 386,698

[22] Filed: Jul. 31, 1989

[30] Foreign Application Priority Data

Aug. 5, 1988 [JP] Japan ................. 63-195713
Aug. 5, 1988 [JP] Japan ................. 63-195714

[51] Int. Cl.⁵ .............................................. H04N 3/14
[52] U.S. Cl. ........................... 358/213.1 S; 358/163
[58] Field of Search .................. 358/213.15, 213.16, 358/213.17, 213.18, 163, 167

[56] References Cited

U.S. PATENT DOCUMENTS

| 4,680,624 | 7/1987 | Murakami | 358/163 |
| 4,703,442 | 10/1987 | Levine | 358/163 |
| 4,742,394 | 5/1988 | Dielhof | 358/213.1 S |

*Primary Examiner*—Stephen Brinich
*Attorney, Agent, or Firm*—Antonelli, Terry, Stout & Kraus

[57] ABSTRACT

A noise reduction circuit receives a periodic signal from an imaging device, and includes first and second circuits in which noise components opposite in phase are offset by delaying the input signal to produce a delayed signal and adding the delayed signal and the input signal. The output of the first circuit is supplied to a low pass filter, while the output of the second circuit is integrated through a first high-pass filter for a time wherein an output signal representing the sum of the input signal and the delayed signal is generated and is then outputted through a second high pass filter. Output signals of the low-pass filter and the second high-pass filter are then added and the result is outputted as a signal free noise.

6 Claims, 6 Drawing Sheets

NOISE REDUCTION CIRCUIT FOR AN IMAGING AND RECORDING APPARATUS WITH AN MOS SOLID-STATE IMAGING DEVICE

BACKGROUND OF THE INVENTION

The present invention relates to a noise reduction circuit, and is particularly concerned with a noise reduction circuit usable, for example, with an MOS solid-state imaging device.

The random noise produced in an MOS solid-state imaging device has a noise spectrum of a so-called triangular noise, wherein a noise component increases with increase in frequency. This may result particularly from an output terminal capacitance of the signal being large as compared with other elements.

With reference to noise in a MOS solid-state imaging device, there is a discussion, for example, in "CCD Camera Art" by Yasuo Takemura, p. 32, published by Radio Gijutsusha on Nov. 3, 1986.

Meanwhile, in a recording apparatus of a high resolution recording system, since the band of the image signal expands, the aforementioned noise cannot be neglected when using such a MOS solid-state imaging device.

SUMMARY OF THE INVENTION

An object of the invention is to provide a noise reduction circuit capable of reducing random noise effectively through a circuit of simple construction.

In accordance with one feature of the invention, first and second circuits each comprise a delay circuit for producing a signal delayed for a predetermined time within a constant period upon receipt of an input signal supplied periodically and an adder circuit for adding the input signal and delayed signal, respectively. An output signal of the first circuit is fed to a low-pass filter, while an output signal of the second circuit is integrated through a first high-pass filter for a time wherein an output signal representing an addition of the input signal and the delayed signal is generated and is then outputted through a second high-pass filter. Output signals of the low-pass filter and the second high-pass filter are added and then the result of the addition is outputted.

According to the aforementioned arrangement, noise components opposite in phase are offset or reduced by adding the input signal and the delayed signal in both of the first and second circuits. The output signal of the low-pass filter has a low frequency component, and after a high frequency component in the output signal of the first high-pass filter is integrated without generating a reflected noise, the high frequency component with an unnecessary low frequency component removed is provided at the output of the second high-pass filter and the aforementioned low frequency component is added thereto, with the result that a signal with less noise will be obtainable.

In accordance with another feature of the invention, an input signal supplied at a constant period is separated into low and high frequency components with half of an input signal period being used as a cut-off. The low frequency component is subjected to a delay adding process or is formed directly as a signal, the high frequency component is passed through a primary low-pass filter with the signal period as a cut-off, is then passed for half or more of the signal period through a high-pass filter and integrated by an integrating circuit. The output signal is again passed through a similar high-pass filter and is added to the aforementioned low frequency component to generate an output.

According to the above arrangement, the signal is processed separately into low and high frequency components, therefore a reflected noise according to an integrating operation will never be generated, thus realizing a noise reduction.

The above and other objects and novel features of the invention will become apparent from the following description and the accompanying drawings

DETAILED DESCRIPTION OF THE PREFERRED EMBODIMENTS

Although not particularly essential, a solid-state imaging device MID comprises an MOS imaging device. An output signal of the solid-state imaging device MID is supplied to a noise reduction circuit through a preamplifier PA. While the detailed construction of the imaging device MID is not indicated in FIG. 1, the preamplifier PA is shown as a negative feedback amplifier including a feedback resistance, for example. Such a MOS solid-state imaging device MID will be described in detail later in this specification.

Figure 1:
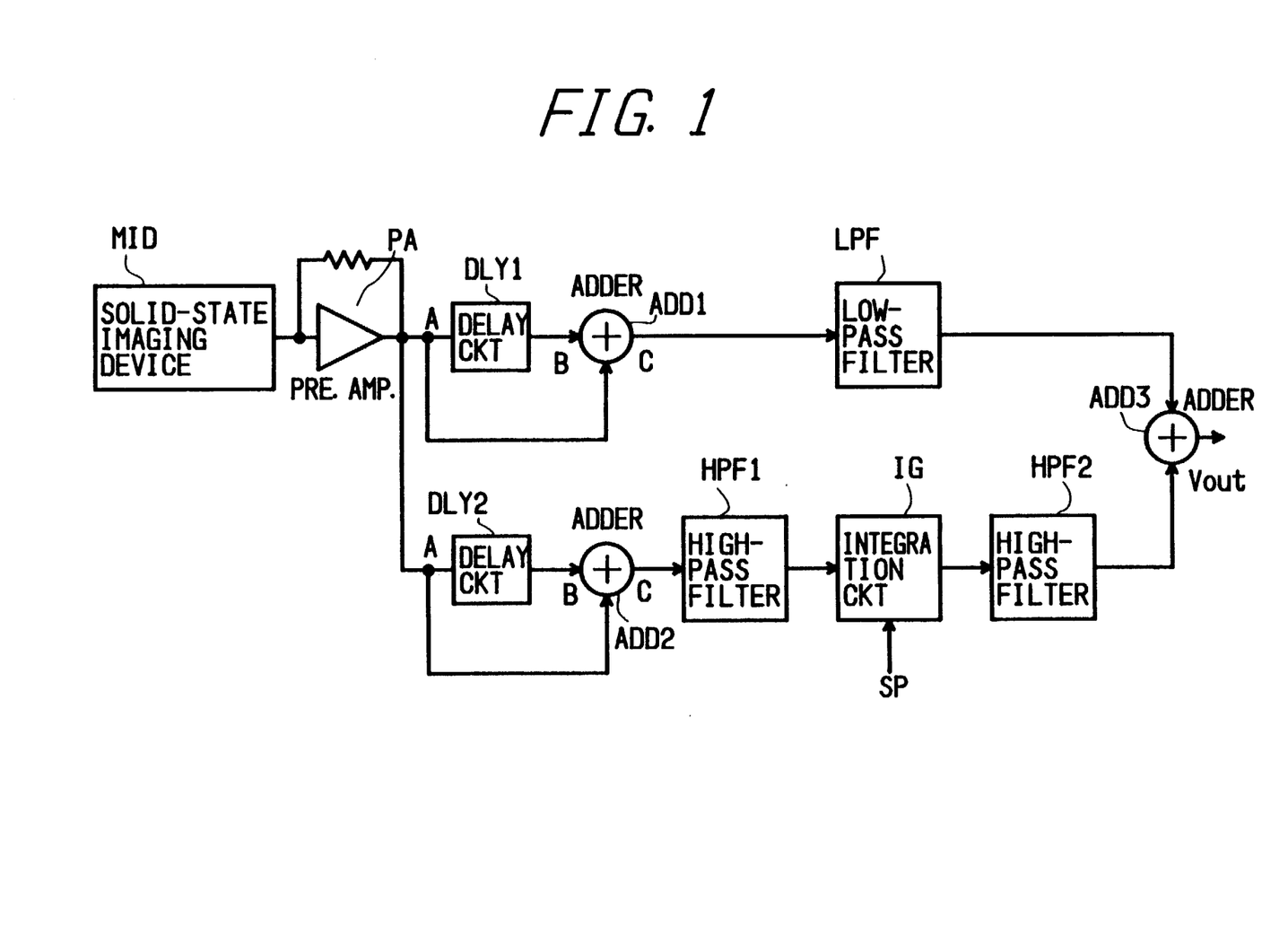
FIG. 1 is a schematic block diagram representing one example of an imaging apparatus comprising a noise reduction circuit according to the invention.

A signal A formed by the aforementioned preamplifier PA is supplied to one input of an addition circuit ADD1 through a delay circuit DLY1, and is also supplied directly to another input of the addition circuit ADD1. The delay time of the delay circuit DLY1 is set to about a half period, and is subject absolutely to being within one period a of the signal A outputted from the preamplifier PA at a constant period. While not so indicated, such delay circuit DLY1 may comprise a delay line using, for example, inductance and resistance elements. A first circuit comprises the delay circuit DLY1 and the addition circuit ADD1, and a second circuit comprises a similar delay circuit DLY2 and addition circuit ADD2.

In the first and second circuits, in view of a signal being formed at a constant period, if the signal is delayed within the constant period, then an addition of the delayed signal thereto will never result in substantial mixing of the signals. In the waveform diagram of FIG. 4, a noise signal having a delay time corresponding to a half period typically exemplifies the random noise included in the signal A and its delayed signal B, and since the phases of the noise are inverted, noise components opposite in phase to each other are offset to zero in the addition output C. That is, if the delay time is denoted by t in the first and second circuits, then the cut-off frequency fc = ¼t, thus indicating a signal transfer characteristic having a cosine property. For example, if the delay time t is set by at 70 ns, the cut-off frequency fc will be 7.2 MHz.

Figure 5:
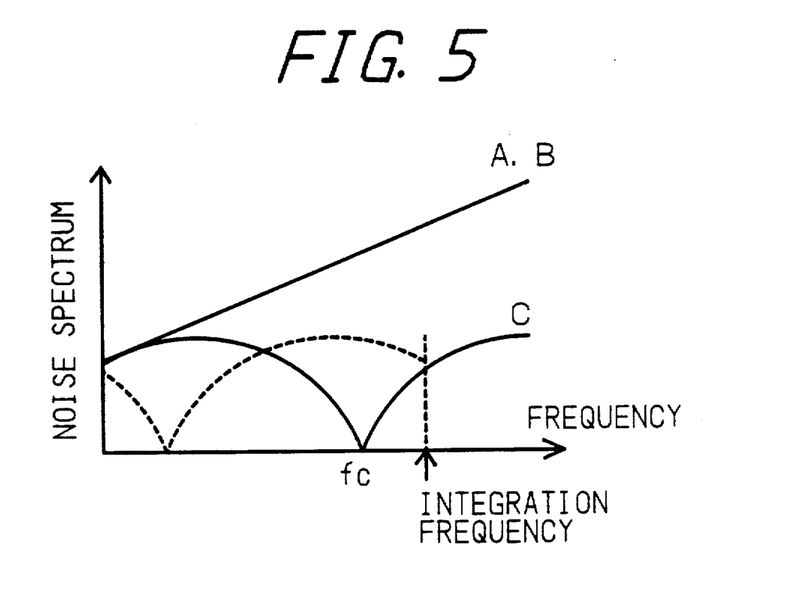
FIG. 5 is a noise spectrum characteristic diagram for illustrating the invention.

Accordingly, as shown by the noise spectrum in FIG. 5, while both signals A and B have a so-called triangular noise wherein a noise component increases with increase in frequency, the addition output C is multiplied by a cosine curve and hence has the noise component sharply reduced in correspondence to the cosine curve, so that noise is reduced to zero at the cut-off frequency fc. For example, if the delay time t is set at 70 ns as mentioned above, then the cut-off frequency fc becomes 7.2 MHz, and so the random noise in an image signal over a wide band can be reduced sharply.

Although not indicated, the base construction of the aforementioned noise reduction circuit may be expanded. That is, more than one delay circuit may be provided, each having a respective delay time, or a cut-off frequency with the result that a noise frequency component which corresponds to each cut-off frequency can be reduced, and an overall transfer characteristic may be obtained in which a plurality of cosine curves are multiplied by the above triangular noise. Consequently, the random noise can be reduced almost uniformly over the entire band in the output signal C. Then, with the delay circuit and the addition circuit as a unit circuit and the delay time of each delay circuit of the unit circuit varied as indicated above, a plurality of unit circuits will be connected longitudinally, which is effective in realizing a reduction of the random noise as a whole covering the overall signal band as in the above case. Still, in another construction the aforementioned delay adding process will be omitted, and the input signal A will be supplied directly to a low-pass filter LPF, as will be described later for the low frequency component.

Figure 4:
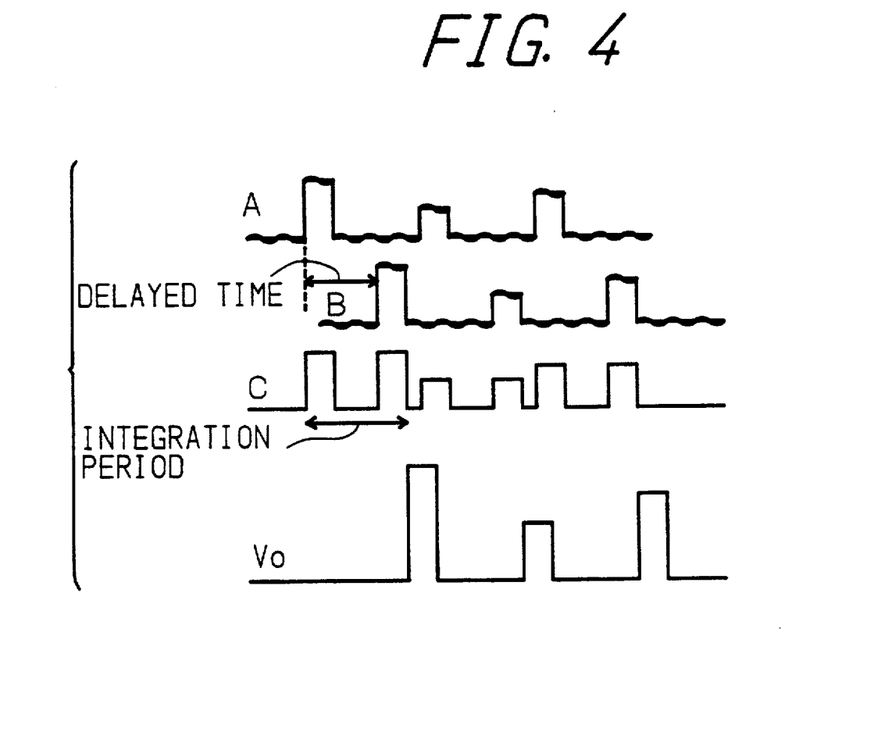
FIG. 4 is a waveform diagram for illustrating one example of how the above noise reduction circuit of FIG. 1 operates.

In the first and second circuits, a MTF (Modulation Transfer Function) will also deteriorate like the output signal C of FIG. 4 through a process adding of signals. Since the MTF is advantageous for good resolution, there yet remains something to improve with the construction employing first and second circuits only with respect particularly to resolution.

Now, therefore, an integrating circuit IG is provided for the second circuit on an output side of the addition circuit ADD2. That is, since a signal from the solid-state imaging device is generated with a constant period, the addition output C is integrated and generated at a constant period for the time during which the signals A and B are generated in response to an integrating pulse SP. With such a construction, as shown in FIG. 4, an integration output Vo can be adjusted to a signal free from expansion unlike the signal C according to the addition operation, and so a deterioration of the MTF, can be prevented. In other words, a high resolution is attainable. Then, in accordance with the above integrating operation, a cosine property of the signal C will be multiplied by a SINC function (sin X/X).

However, if such integrating circuit IG is provided, a noise from the low frequency component will be reflected around the integration frequency according to the integrating operation, thus limiting the noise reduction affect.

Now, therefore, in the embodiment, the first and second circuits are provided as described hereinbefore, and a low-pass filter LPF is provided on an output side of the first circuit. The low-pass filter LPF limits the band to one-half (fc/2) or less of the signal frequency fc. Then, a first high-pass filter HPF1 is provided for an output signal of the second circuit, and only signals fc/2 or more are allowed to pass therethrough. The reason is that for integration, the high-pass filter HPF1 thus provided will not allow a reflected noise from the low frequency component side to come within the band from fc/2 to fc. Accordingly, the reflected noise can be prevented from increasing irrespective of an integration operation by the integrating circuit IG. Then, an output signal of the integration circuit IG has an unnecessary band for a high noise to reflect on the low frequency component side removed by a second high-pass filter HPF2.

In this way, an output signal $V_{OUT}$ with a noise reduced noise component will be obtained through adding an output signal of the low-pass filter LPF and an output signal of the second high-pass filter HPF2.

Figure 2:
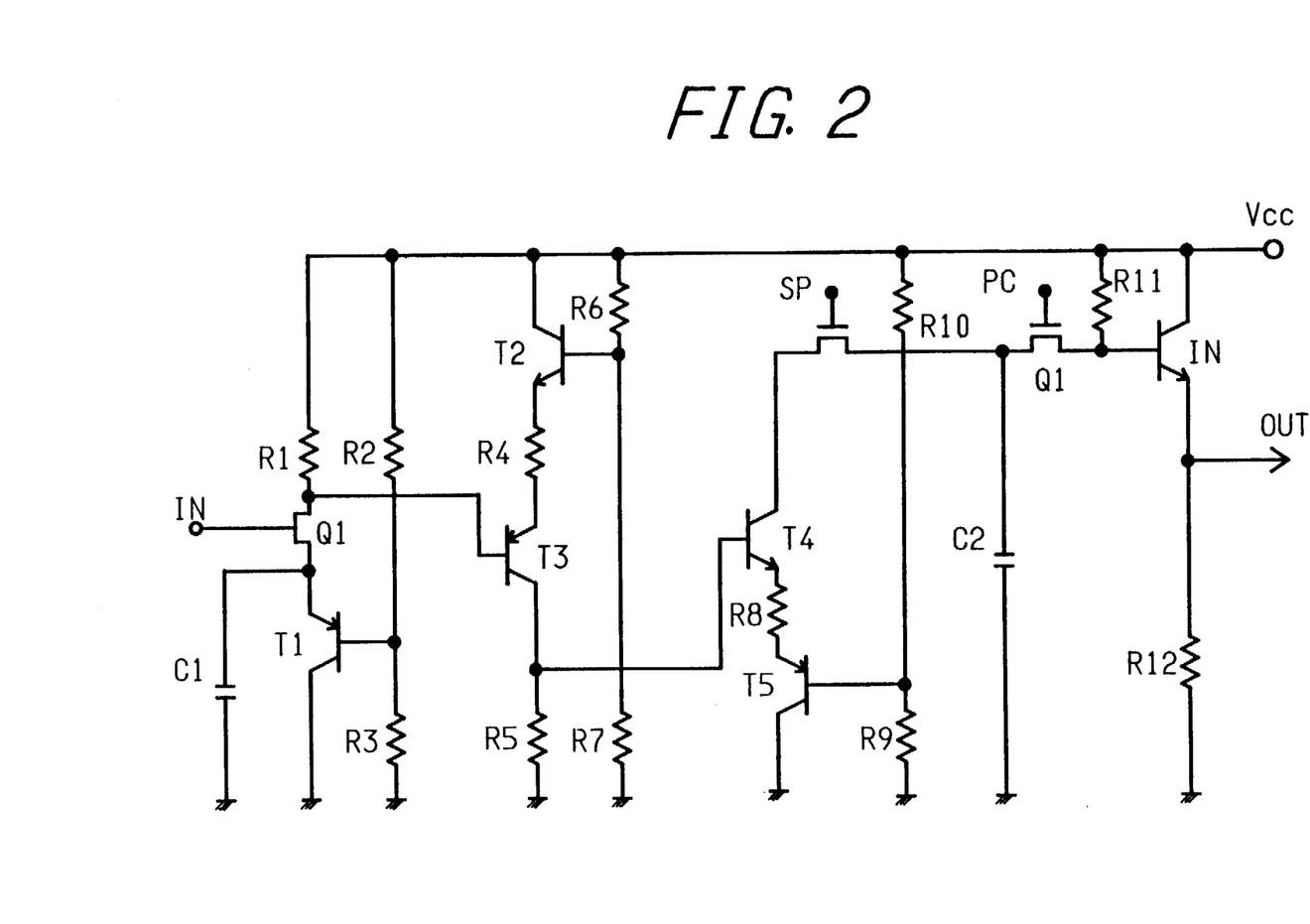
FIG. 2 is a circuit diagram representing one example of an integrating circuit used in the noise reduction circuit of FIG. 1.

FIG. 2 is a circuit diagram representing one example of the integration circuit IG.

A signal having passed through the first high-pass filter HPF1 is supplied to a gate of a junction type FET (hereinafter simply called "transistor") Q01. A load resistance R1 is provided between the drain electrode of the transistor Q01 and a supply voltage $V_{CC}$. A pnp-type transistor T1 for forming a bias voltage and a capacitor C01 are provided in parallel between the source electrode of the transistor Q01 and a ground potential point of the circuit. A divided voltage formed by resistances R2 and R3 in series between the supply voltage VCC and the ground potential point of the circuit is supplied to the base electrode of the transistor T1. Thus, a bias voltage for which the divided voltage is shifted in level by a voltage $V_{BE}$ between base and emitter of the transistor T1 is provided to the source electrode of the transistor Q01.

The output signal obtainable from the drain electrode of the transistor Q01 is supplied to the base electrode of a pnp-type amplifier transistor T3. A load resistance R5 is provided between collector electrode of the amplifier transistor T3 and a ground potential point of the circuit. Then, an emitter resistance R4 and an npn-type transistor for forming a bias voltage likewise are provided in series between the emitter electrode of the amplifier transistor T3 and the supply voltage $V_{CC}$. A divided voltage formed by a voltage divider circuit comprising resistances R6 and R7 is supplied to a the base electrode of the transistor T2 Thus, the transistor T2 provides a voltage for which the divided voltage is shifted in level by the voltage $V_{BE}$ between base and emitter electrodes thereof.

The output signal obtainable from the collector electrode of the amplifier transistor T3 is supplied to the base electrode of an npn-type amplifier transistor T4. A bias circuit analogous to the above which comprises an emitter resistance R8, a pnp-type transistor T5 and voltage dividing resistances R9, R10 is provided between the emitter electrode of the transistor T4 and the ground potential point of the circuit.

The each circuit element forms an input stage circuit (and concurrently the addition circuit) of the integrating circuit, and the amplifier transistor T4 is made to work as an output transistor therefor. The collector electrode of the transistor T4 is connected to one electrode of a capacitor CO2 comprising the integrating circuit through a transmission gate MOSFET (dielectric gate type field effect transistor) Q03 which is switched by the integrating pulse SP. The other electrode of the capacitor CO2 is coupled to the ground potential point of the circuit.

The one electrode of the capacitor CO2 is connected to a resistance R11 for reading and resetting (precharging) a signal charge through a switch MOSFET Q02 for receiving a precharge pulse (output pulse) PC. The resistance 11 has its other end connected to the supply voltage $V_{CC}$.

A signal formed by a voltage drop of the resistance R11, namely a readout signal of the signal charge of the capacitor CO2 is supplied to the base electrode of an npn-type amplifier transistor T6. The transistor T6 forms an emitter follower output circuit by having the collector coupled to the supply voltage $V_{CC}$ and the emitter provided with a load resistance R12, forming an output signal as the integration output.

In the integrating circuit of this embodiment, with the integrating pulse SP at high level, the switch MOSFET Q03 is turned on. Thus, a charge precharged on the capacitor C02 is subjected to a discharge operation according to an output signal of the input stage amplifier circuit. In other words, the output signal of the input stage circuit is stored in the capacitor CO2 to perform an integrating operation. In this case, for example, if the alternating polarity has a clock noise of positive/negative symmetry, then such noise can be offset by the integrating operation. With the integrating pulse SP at low level, the switch MOSFET Q03 is turned off, and also with the precharge pulse PC at high level, the switch MOSFET Q02 is turned on, so that a charge quantity discharged from the capacitor CO2 is made to correspond to an integration of the addition signal C (A + B).

With the above construction, a precharge operation is carried out according to an on-state of the switch MOSFET Q02, and current to compensate a charge quantity (direct current component) corresponding to the charge quantity (including a noise integral quantity) corresponding to a signal integral quantity flows from the resistance R11, thus carrying out an output operation of the integrating signal and a precharge for the next integrating operation. The above ringing current is converted into a voltage signal by the resistance R11, amplified by the emitter follower output transistor, and is then generated as an output signal.

The above-described construction for controlling the integrating operation with the switch MOSFET Q03 in an on-state may be replaced by a construction wherein a switching transistor or the like provides a ground potential of the circuit forcedly to the base electrode of the transistor T4 at the time of non-integration.

According to the construction wherein two pulses (SP, PC) are used for the integrating circuit as described above, both integration time and output time can be set arbitrarily. For simplification of the circuit, a turnover signal of the integrating pulse SP may be formed and supplied to the gate electrode of the switch MOSFET Q02.

Figure 3:
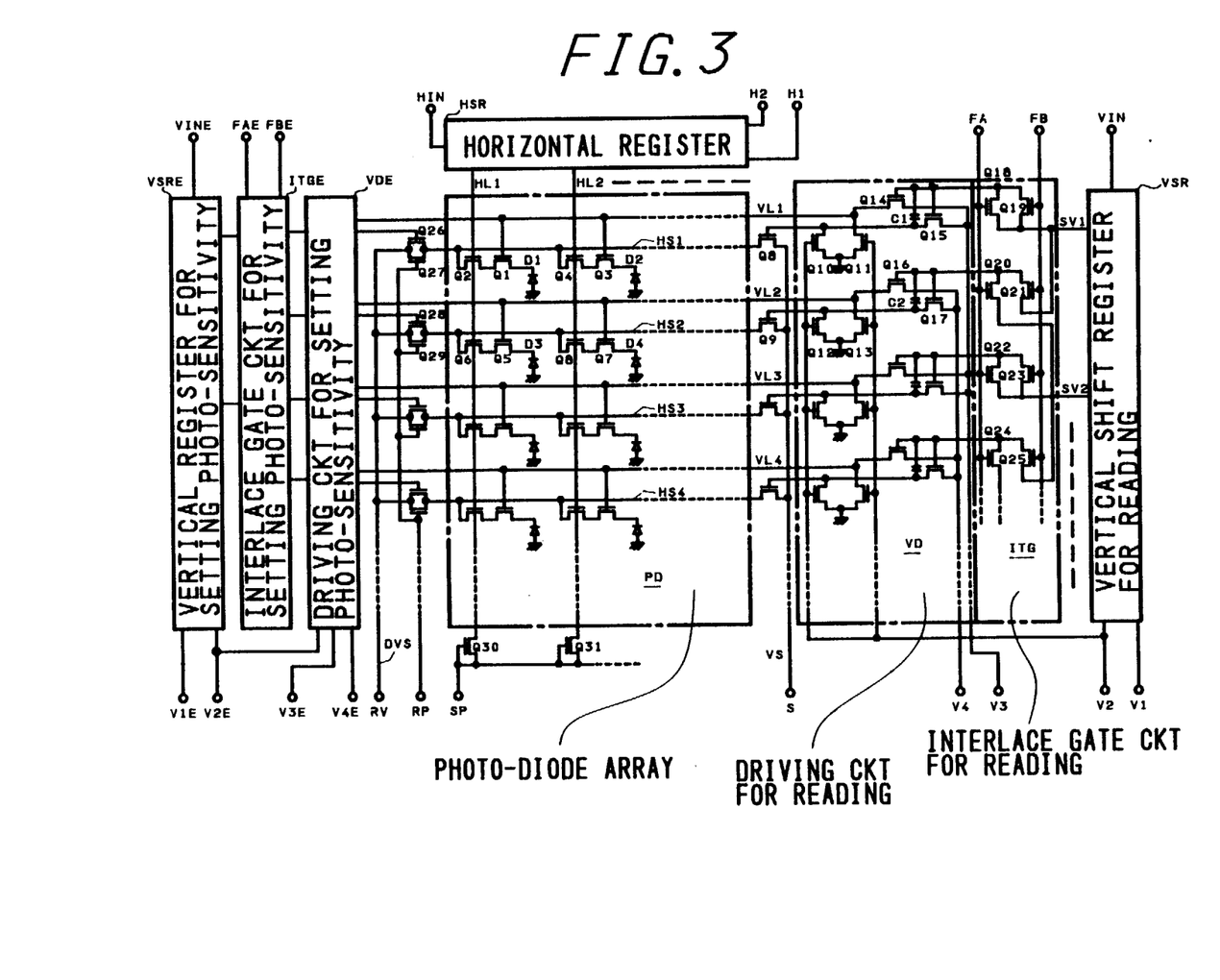
FIG. 3 is a circuit diagram representing one example of a solid-state imaging device in which the noise reduction circuit of FIG. 1 is used.

FIG. 3 is a circuit diagram representing one example of a solid-state imaging device MID preferable for use with the noise reduction circuit according to the invention.

While not particularly limited, the solid-state imaging device of the example is that of a TSL (Transversal Signal Line) system having a sensitivity variable function.

Each circuit element in the figure is formed on a semiconductor substrate, although this is not essential, like a single crystal silicon in accordance with the well known semiconductor integrated circuit manufacturing technology. The major blocks are depicted in line with the actual geometrical arrangement.

For example, a matrix array of 4-row and 2-column is indicated as the picture element array PD. However, for simplication of drawing, only the picture element cells of two rows among said 4 rows are provided with circuit symbols. A picture element cell is formed by a series circuit of a photodiode D1, a switch MOSFETQ1 of which the gate electrode is coupled to the vertical scanning line VL1 and a switch MOSFETQ2 of which the gate electrode is coupled to the horizontal scanning line HL1. The output nodes of other similar picture element cells. (D2, Q3, Q4) arranged in the same row (horizontal direction) as said picture element cell consisting of the photodiode D1 and switches MOSFETQ1, Q2 is connected to the horizontal signal line HS1 extended in the lateral direction in the same figure. For the other row, similar picture element cells are also coupled as explained previously.

The horizontal scanning line HL1 indicated as an example is extended in the perpendicular direction in the same figure and connected in common to the gate electrodes of the switches MOSFETQ2, Q6 of the picture element cells arranged in the same column. The picture element cells arranged in the other columns are also connected to the corresponding horizontal scanning line HL2 in the same way.

In this embodiment, the switches MOSFETQ8, Q9 and Q26, Q28 are provided respectively at both ends of the horizontal signal lines HS1 to HS4 forming said picture element array in order to add a substantially automatic aperture mechanism to the solid state image pickup device, in other words, to vary the substantial accummulation period of the photo diode. The switches MOSFETQ8, Q9 arranged at the right end side respectively connect the horizontal signal lines HS1, HS2 to the output line VS extended in the perpendicular direction. This output line VS is connected to the terminal S and a readout signal is transmitted through the terminal S to the input a preamplifier provided externally. Moreover, the switches MOSFETQ26, Q28 arranged at the left end side respectively connect the horizontal signal lines HS1, HS2 to a dummy (reset) output line DVS extended in the perpendicular direction. This output line DVS is connected to the terminal RV. Thereby, if necessary, the signal of said dummy output line DVS is transmitted from the external terminal RV.

In this embodiment, although not essential, the horizontal signal lines HS1 to HS4 of each row are provided with switches MOSFETQ27, Q29 which are turned ON by the reset signal supplied in the horizontal retrace period from the terminal RP. When these switches MOSFETQ27, Q29 are turned ON, a constant bias voltage (not illustrated) is applied to the horizontal signal lines HS1 to HS4 from the external terminal RV through the dummy output line DVS. The reset switches MOSFETQ27 and Q29 are provided for the following reason. The semiconductor region, such as the drain, etc. of the switch MOSFET connected to said horizontal signal lines HS1 to HS4 may have a photo-sensitive property and false signals (smear, blooming) formed by such parasitic photodiode are accummulated in the horizontal signal lines which float during the non-selecting condition. In this embodiment, accordingly, all horizontal signal lines HS1 to HS4 are reset to said specified bias voltage during the horizontal retrace period as explained previously. Thereby, since the picture element signal is always extracted under the condition that the false signal is reset, regarding the selected horizontal signal lines, the false signal included in the output image signal can be reduced remarkably.

The horizontal scanning signal generated by the horizontal shift register HSR is supplied to said horizontal scanning lines HL1 to HL2, etc.

The scanning circuit which executes a vertical selecting operation (horizontal scanning operation) in the picture element array PD is formed by the following circuits.

In the case of this embodiment, a pair of scanning circuits are provided at both ends of the horizontal signal lines HS1 to HS4 of the picture element array PD, corresponding to a pair of switches MOSFETQ8, Q9 and switches MOSFETQ26, Q28.

In this embodiment, selective simultaneous scanning for two rows and the scanning in the non-interlace mode are possible in addition to the interlace mode for application in industrial use. A scanning circuit is provided at the right side of the picture element array PD. The vertical shift register VSR forms the output signals SV1, SV2 to be used for a reading operation. These output signals SV1, SV2 are supplied to the vertical scanning lines VL1 to VL4 and switches MOSFETQ8, Q9 through the interlace gate circuit ITG and drive circuit VD.

The interlace gate circuit ITG executes a vertical selecting operation (horizontal scanning operation) in the interlace mode. Therefore, in the first (odd number) field, the vertical scanning lines VL1 to VL4 are selected simultaneously through a combination of the adjacent vertical scanning lines VL1, VL2 and VL3. Namely, the output signal SV1 of the vertical shift register VSR is output to the vertical scanning line VL1 which selects the horizontal signal line HS1 by means of the switch MOSFETQ18 which is controlled by the odd number field signal FA. In the same way, the output signal SV2 of the vertical shift register VSR is output to the vertical scanning lines VL2 and VL3 in such a manner as to simultaneously select the horizontal signal lines HS2 and HS3 by use of the switch MOSFETQ20 and Q22 which are controlled by the signal FA. In this way, the selecting signal for a pair of horizontal signal lines consisting of a combination in the same sequence can be formed In the second (odd number) field, the vertical scanning lines VL1 to VL4 are selected simultaneously through a combination of the adjacent vertical scanning lines VL1, VL2 and VL3, VL4. Namely, the output signal SV1 of the vertical shift register VSR is output to the vertical scaning lines VL1 and VL2 which select the horizontal signal lines HS1 and HS2 by means of the switches MOSFETQ19, Q21 which are controlled by the even number field signal FB. In the same way, the output signal SV2 of the vertical shift register VSR is output to the vertical scanning lines VL3 and VL4 in order to simultaneously select the horizontal signal lines HS3 and HS4 by means of the switches MOSFETQ23 and Q25 which are controlled by the signal FB In this way, the selecting signal for a pair of horizontal signal lines consisting of a combination in the same sequence can be formed.

A plurality of kinds of horizontal scanning operations explained hereunder are realized by the interlace gate circuit ITG and the following drive circuit DV.

An output signal from the interlace gate circuit ITG corresponding to the one vertical scanning line VL1 is supplied to the gates of switches MOSFETQ14 and Q15. The drain electrode common to these switches. MOSFETQ14 and Q15 is connected to the terminal V3. The switch MOSFETQ14 supplies the signal sent from the terminal V3 to the vertical scanning line VL1. In addition, the switch MOSFETQ15 supplies the signal sent from the terminal V3 to the gate electrode of switch MOSFETQ8 which connects the horizontal signal line HS1 to the output line VS. Moreover, with a view toward preventing the high level of the output signal from being lowered much as the threshold voltage of the switch MOSFETQ14, Q15, a capacitor C1 may be provided between the gate of MOSFETQ14 and the output side (source side) of MOSFETQ15. Thereby, when the output signal from the interlace gate circuit ITG is set to a high level, the voltage of the terminal V3 is set to a low level and thereby the capacitor C1 is precharged Thereafter, when the voltage of terminal V3 is set to a high level, the gate voltage of the MOSFETQ14 and Q15 can be increased by the bootstrap effect of the capacitor C1.

An output signal from the interlace gate circuit ITG corresponding to the verticl scanning line VL2 adjacent to the vertical scanning line VL1 is supplied to the gate of switches MOSFETQ16 and Q17. The common drain electrode of these switches MOSFETQ16 and Q17 is connected to the terminal V4. The switch MOSFETQ16 supplies the signal sent from the terminal V4 to the vertical scanning line VL2. Moreover, the switch MOSFETQ17 supplies the signal sent from the terminal V4 to the gate electrode of switch MOSFETQ9 which connects the horizontal line HS2 to the output line VS. Moreover, a capacitor C2 may be provided, between the gate of MOSFETQ16 and the output side (source side,) of MOSFETQ17 in order to prevent the high level of the output signal from being lowered as much as the threshold voltage of the switches MOSFETQ16, Q17. Accordingly, the gate voltages of the MOSFETQ16 and Q17 can be boosted owing to the bootstrap effect of capacitor C2 by changing the voltage of terminal V4 with a similar timing as explained previously.

The terminal V3 is provided in common to the switch MOSFET corresponding to the vertical scanning lines (horizontal signal lines) of odd numbers, while the terminal V4 is provided in common to the vertical scanning lines (horizontal signal lines) of even numbers.

As will be understood from the above explanation, the read operation in the interlace mode can be realized by a combination of selective supply of a timing signal to the terminal V3 and V4 and simultaneous selecting operations to two lines by the interlace gate citcuit ITG. For example, the vertical scanning lines (horizontal signal lines) can be selected in the sequence of VL1 (HS1), VL3 (HS3) by supplying a timing signal being synchronized with operations of said vertical shift register VSR to the terminal V3 under the condition that the terminal V4 is set to a low level in the odd number fields FA In addition, the vertical scanning lines (horizontal signal lines) can be selected in the sequence of VL2 (HS2) and VL4 (HS4) by supplying a the timing signal synchronized with operations of said shift register VSR to the terminal V4 under the condition that the terminal V3 is set to a low level in the even number fields FB.

Meanwhile, when the terminals V4 and V3 are set to a high level simultaneously as in the above case, 2-line simultaneous scanning can be realized in accordance with an output signal from the interlace gate circuit ITG. In this case, the vertical shift of spacial gravity, in other words, an equivalent interlace mode, can be realized because a combination of two rows output for two screens by two field signals FA and FB is shifted vertically as much as a single line as explained previously.

Moreover, for example, the selecting operation in the non-interlace mode can also be realized in the sequence of VL1, VL2, VL3 and VL4 by setting only the FB signal to a high level and operating twice the horizontal shift registers HSR at the one vertical scanning timing and then setting the terminals V3 and V4 to a high level in synchronization with such operations. In this case, it is desirable that the frequency of clock pulses to be supplied to the horizontal shift register HSR and vertical shift register VSR be doubled. Namely, the images can be read at a rate of 60 frames/sec by the non-interlace system by doubling the frequency of the clock signal supplied to the horizontal shift register HSR and vertical shift register VSR from the terminals H1, H2 and terminals V1, V2. The terminals HIN and VIN are provided for supplying the input signals which are respectively shifted by the shift registers HSR, VSR and the shift operation is started with such a timing that the input signal is applied. Therefore, on the occasion of carrying out 2-row simultaneous reading, interlace scanning and non-interlace scanning may be through provided combination of the input signals applied to the interlace gate circuit ITG and input terminals V3, V4. However consideration must be given to the timing in the supply of an input signal to the shift register VSR so that geometrical relation in the vertical direction of the output signal is not inverted.

In addition, the MOSFETQ10 and Q11 for reset are provided among each vertical scanning line VL1, the gate of the switch MOSFETQ8 corresponding thereto and the grounding potential points of the circuit. These MOSFETQ10 and Q11 for reset receive the clock signal supplied from the terminal V2 in common to the MOSFET for reset corresponding to the other vertical scanning line and switch MOSFET and set at a high speed the voltage of said selected vertical scanning line and the gate of switch MOSFET to low level.

In the case of this embodiment, with a view toward adding the sensitivity varying function as described previously, the vertical shift register VSRE, interlace gate circuit ITG and drive circuit DVE for controlling the sensitivity are provided. These circuits for sensitivity control may be arranged in the left side of the picture element array PD. The vertical shift register VSRE, interlace gate circuit ITG and drive circuit DVE are formed circuits similar to the vertical shift register VSR, interlace gate circuit ITG, and drive circuit DV used for the readout operation. Similar timing signals are also supplied from the terminals V1E to V4E, VINE and FAE, ABE respectively. In this case, the same clock signal may be supplied, to the terminals V1E, V1 and V2E, V2 in order to realize the shift operation in the synchronized timing of said vertical shift register VSR for the readout operation and the vertical shift register VSRE for varying sensitivity. Accordingly, the terminals V1E, V1 and V2E, V2 may be arranged in common by the internal circuit. As explained previously, individual terminals V1E and V2E are provided in order that a solid state image pickup device is introduced into a television camera having a manual aperture function or existing mechanical aperture function. In case the sensitivity varying operation is not carried out as explained above, useless power consumption by the vertical shift register VSRE can be suppressed by setting the terminals V1E and V2E to such a low level, such as the grounding potential of the circuit.

Next, the sensitivity control operation in the solid state image pickup device of the present embodiment will be explained hereunder.

For simplification of explanation, the vertical scanning operation in the non-interlace mode will be explained as an example. For instance, the selecting operation of the fourth row (vertical scanning line VL4, horizontal signal line HS4) is carried out in parallel with the readout operation of the first row (vertical scanning line VL1, horizontal signal line HS1) by the vertical shift register VSRE, interlace gate circuit ITG and drive circuit DVE for sensitivity control Thereby, the optical signals being accummulated in the photodiodes D1, D2, etc. of the first row are read on a time series basis to the output signal line VS in synchronization with the selecting operation of the horizontal scanning lines HL1, HL2 formed by the horizontal shift register HSR. This readout operation is carried out by supply of a current corresponding to the optical signal sent from the terminal S through a load resistance and the precharge (reset) operation is carried out simultaneusly with the readout operation. Similar operations are also carried out for the photodiodes of the fourth row. In this case, the readout operation of the fourth row is carried out for the dummy output line DVS by the scanning circuits (VSRE, ITGE, DVE) for varying sensitivity. In case only the sensitivity control is carried out, a bias voltage which is the same as that of terminal S is applied to the terminal RV. Thereby, the optical signal already accummulated in each picture element cell of the fourth line is exhausted, in other words, a reset operation is carried out.

Accordingly, since the readout operation of the fourth row (vertical scanning line VL4, horizontal signal line HS4) by the vertical shift register VSR, interlace gate circuit ITG and drive circuit DV is carried out in the vertical scanning operation after the readout operations of the first row third row, the accummulation time of photodiodes of picture element cells arranged for the fourth row becomes equal to the readout time of picture element cells of three rows.

In place of above operation, the selecting operation of the second row (vertical scannig line VL2, horizontal signal line HS2) is carried out in parallel with the readout operation of the first row (vertical scanning line VL1, horizontal signal ine HS1) by the vertical shift register VSR, and interlace gate circuit ITG and drive circuit DV, by the vertical shift register VSRE, interlace gate circuit ITG and drive circuit DVE for sensitivity control. Thereby, the optical signal accummulated in the photodiodes D1, D2 for the first row are read on a time series basis to the output signal line VS in synchronization with the selecting operation of the horizontal scanning lines HL1, HL2 formed by the horizontal shift register HSR. This readout operation is carried out by supply of a current corresponding to the optical signal from the terminal S through a load resistance and the precharge (reset) operation is also carried out simultaneously with such readout, operation. Similar operations are also carried out for the photodiodes D3, D4 of the second row. Thereby, the optical signal accummulated in the picture element cells of the second row is exhausted in parallel with the readout operation of the first row. Therefore, since the readout operation of the second row (vertcal scanning line VL2, horizontal signal line HS2) by the vertical shift register VSR, interlace gate circuit ITG and drive circuit DV is carried out after the readout operation of the first row by in the said vertical scanning operation, the accummulation time of the photodiode of picture element cells arranged for the second row becomes equal to the readout time of the picture element cells for a single row. Therefore, in comparison with the above case, the substantial accummulation time of the photodiode can be reduced to ½, the in other words, sensitivity can be lowered to ½.

As explained previously, since the picture element cells of the relevant row are reset by the preceding vertical scanning operation to be carried out by the scanning circuit for sensitvity control, the time from such reset to actual readout operation by the scanning circuit is considered as the accummulation time for the photodiode. Accordingly, in the case of a picture element array of 525 rows, the accummulation time, in other words, the sensitivity, can be set in the 525 steps in maximum in unit (minimum) of the readout time for a single row by designation of different addresses by both vertical scanning circuits and the selecting operation of the picture element cells by the common horiozntal scanning circuit. However, it is assumed that a change of illumination at the light sensitive surface can be neglected for the scanning time to form one frame and constant light is substantially incident on the photodiode. The maximum sensitivity (525) can be obtained when the scanning circuit for sensitivity control is not operated.

In the case of the sensitivity control operation, the readout of the picture element signal and the reset operation by the preceding vertical scanning operation are conducted in parallel. Thereby, in some cases, the picture element signal for the reset operation may be mixed with the readout signal by capacitive coupling through the substrate. If such capacitive coupling is generated, noise is generated in the readout picture element signal similar to a ghost in a television picture, thereby deteriorating the image quality.

Therefore, this embodiment is provided with the ability to force all horizontal scanning lines to be selected from the external terminal SP through the diode-connected MOSFETQ30, Q31 for the horizontal scanning lines HL1, HL2. Namely, when the terminal SP is set to a high level, all diodes of the type MOSFETQ30, Q31 become ON, without relation to operations of the horizontal shift register HSR, supplying a high level state to all horizontal scanning lines HL1, HL2 and setting them to the selected condition. Moreover, since the selection level is supplied through the unidirectional element, such as the diode-connected MOSFETQ30, Q31, if the terminal SP is set to a low level, the MOSFETQ30, Q31 maintain the OFF state. Thereby, if a forcible simultaneous selection circuit is provided, it does not prevent the horizontal scanning lines HL1, HL2 conforming to the shift operation of the horizontal shift register HSR from being set to the selection level. If the shift operation is adversely affected by the forcible selection level of the horizontal scanning lines HL1, HL2 because the horizontal shift register HSR is formed by a dynamic circuit, a switch circuit may be added so that the selection level is no longer transferred internally to the horizontal shift register HSR.

The simultaneous selecting operation of the horizontal scanning lines HL1, HL2 is carried out during the horizontal retrace period as described later and the preceding vertical scanning is started. Thereby the signal of all picture elements of rows to be reset can be forced to reset previously. Therefore, the picture element signal is not substantially output from the preceding rows during the readout operation of the picture element signal in accordance with the selecting operation of the horizontal scanning line by the horizontal shift register HSR. Accordingly, the noise does not appear in the readout signal even in case capacitive coupling exists through the substrate.

In such a MOS solid-state imaging device, a parasitic capacity in the signal readout system is rather significantly increased as described hereinabove, thus producing a random noise (triangular noise). Accordingly, a quality image signal will be obtainable through using the noise reduction circuit according to the invention.

The functional effects obtainable from the above-described embodiment will be as follows.

(1) First and second circuits comprise a delay circuit for forming a signal delayed for a predetermined time within a constant period upon receipt of an input signal supplied periodically and an addition circuit for adding the input signal and delay signal respectively, thus offsetting or reducing noise components which are opposite in phase. An output signal of the first circuit is supplied to a low-pass filter to form a low component, an output signal of the second circuit has the high component only integrated through a first high-pass filter to an integration on the integrating circuit without producing a reflected noise, and then a high component having an unnecessary low component removed through a second high-pass filter is formed and the aforementioned low component is added thereto, so that a signal with less noise is obtainable effectively.

(2) By applying the noise reduction circuit to an imaging apparatus on which a MOS solid-state imaging device is used, a random noise increasing with increase in the frequency of the signal can sharply be reduced, so that a quality image signal will be obtainable.

Figure 6:
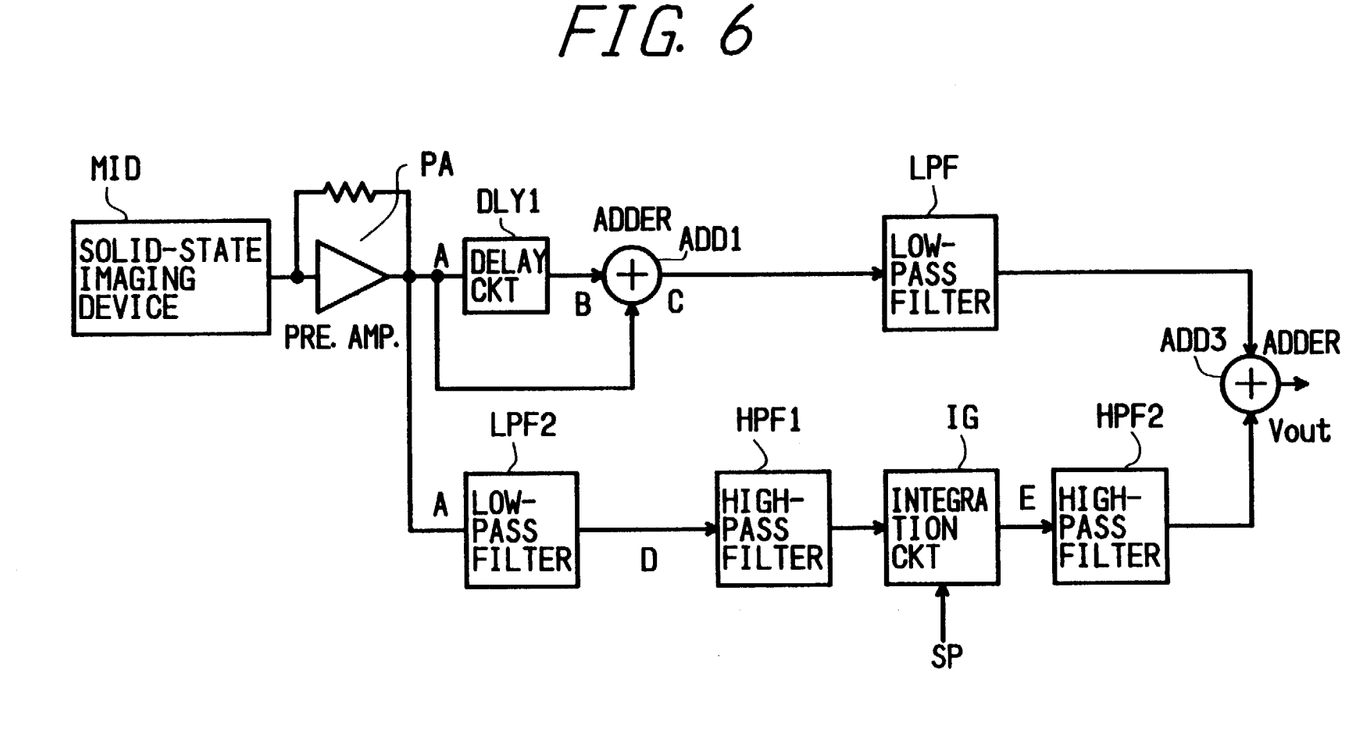
FIG. 6 is a schematic block diagram representing another example of the imaging apparatus comprising the noise reduction circuit according to the invention.
Figure 7:
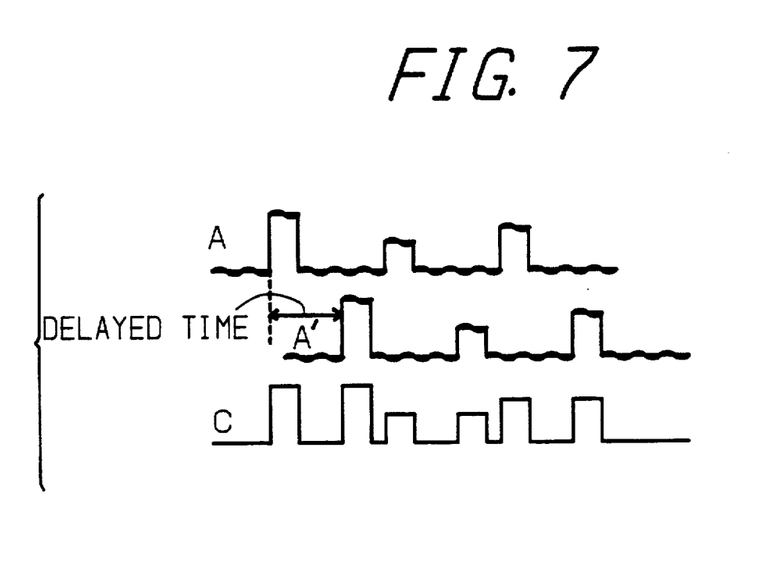
FIG. 7 is a waveform diagram for illustrating one example of how the noise reduction circuit of FIG. 6 operates.

FIG. 6 is a block diagram representing another embodiment of the invention, in which like reference characters denote like parts in FIG. 1. What is different from FIG. 1 is that a high component of the input system on a lower side has the delay circuit DLY2 and the addition circuit ADD2 in FIG. 1 replaced by the low-pass filter LPF2. The operating waveforms of the circuit are shown in FIG. 7.

A signal processing for the high component will be carried out as follows. The signal A provided from the preamplifier PA is inputted to a primary low-pass filter LPF2 with a signal period (fc) as a cut-off An output signal of the low-pass filter LPF2 is supplied to the high-pass filter HPF1 allowing the signal fc/2 to pass therethrough to provide band limitation. An output signal of the high-pass filter HPF1 is integrated by the integrating circuit IG. Thus, in the integrating circuit IG, since the input signal has the low component removed beforehand by the band limitation, the integrating operation will never cause generation of a noise to be reflected from a low component around the integration frequency. Then, an output signal of the integrating circuit IG has an unnecessary band for high component noise to turn over to the low component removed by the second high-pass filter HPF2 provided therefor. Further, an output signal (low component) of the low-pass filter LPF and an output signal (high component) of the second high-pass filter HPF2 are supplied to the addition circuit ADD3, and the output signal $V_{OUT}$ with noise reduced is obtained from an output of the addition circuit ADD3.

Figure 8:
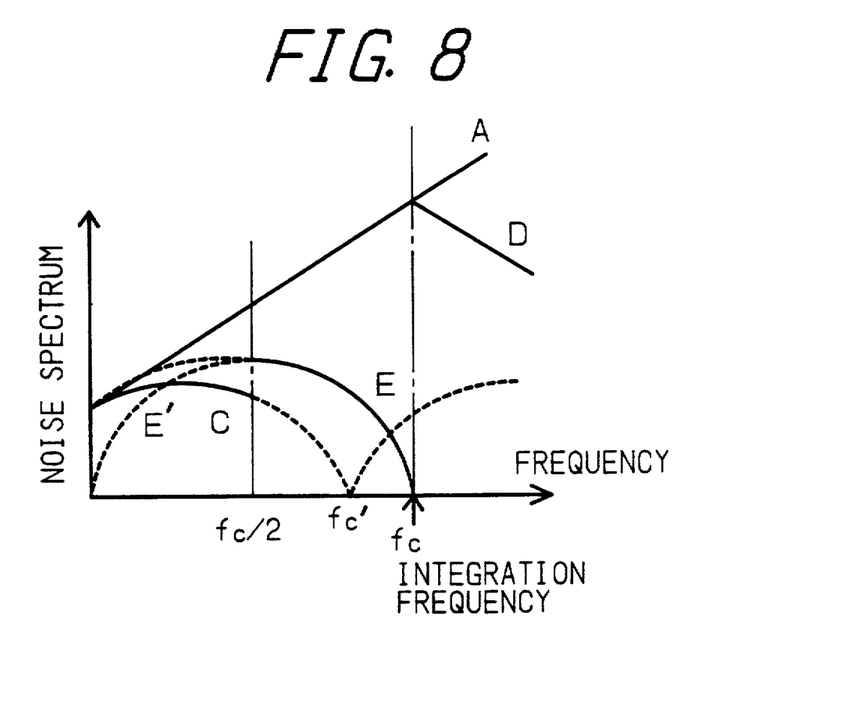
FIG. 8 is a noise spectrum characteristic diagram for illustrating the noise reduction circuit of FIG. 6.

According to the above-described noise reduction circuit, the noise indicated by a dotted line is removed, and the noise can be reduced covering a wide range as indicated by a full line in the noise spectrum of FIG. 8.

The functional effects obtainable from this embodiment are as follows.

(1) An input signal supplied at a constant period is separated into a low component and a high component with a half of the period as a cut-off. The low component is subjected to a delay addition process or provided directly as a signal, while the high component is passed through a primary low-pass filter with the signal period as a cut-off and then is passed for more than half of the signal period through a high-pass filter to effect integration by the integrating circuit. The output signal is again passed through a similar high-pass filter, added to the low component and then outputted. Thus, since the signal is separated into low and high components, a reflected noise will never be generated according to the integrating operation, which is capable of reducing noise effectively.

(2) A use of the delay addition circuit may effect offsetting or reducing of a noise component opposite in phase in the low component.

(3) By applying the noise reduction circuit to an imaging apparatus on which the MOS solid-state imaging device is used, a random noise increasing according to an increase in signal frequency can sharply be reduced, so that a quality image signal is obtainable effectively.

The invention has been described with reference to its preferred embodiments, however, the invention is not necessarily limited thereto, and it is to be understood that changes and modifications may be made without departing from the spirit thereof. For example, various modes of operation, such as an analog addition circuit utilizing an operational amplifier and the like, may be adopted other than using a mere resistance addition circuit. Further, the integrating circuit may be constructed in various ways subject to the integrating time being available for setting on a timing pulse.

The aforementioned sensitivity variable function may be omitted for construction of the MOS solid-state imaging device on which the noise reduction circuit according to the invention is used. In case the random noise spectrum is almost flat, like that in a CCD solid-state imaging device, the S/N ratio can still be improved by employing the noise reduction circuit of the invention. The solid-state imaging device may be a line sensor as well as the area sensor mentioned above.

The invention may be utilized extensively as a random noise reduction circuit for signals generated at a constant period like a solid-state imaging device represented by MOS type and CCD.

What is claimed is:

1. A noise reduction circuit, comprising first and second circuits each consisting of a delay circuit for delaying a received periodic input signal for a predetermined time within a constant period of said input signal to provide a delay signal and an addition circuit for adding said input signal and said delay signal; a low-pass filter connected to receive an output signal from said first circuit; a first high-pass filter connected to receive an output signal from said second circuit; an integrating circuit connected to receive an output signal of the first high-pass filter and for integrating said output signal during a period of time when an addition output of said input signal and delay signal is generated; a second high-pass filter connected to receive an output signal of said integrating circuit; and an output addition circuit for adding an output of said low-pass filter and an output signal of the second high-pass filter to form an output signal from which noise has been eliminated.

2. The noise reduction circuit as defined in claim 1, wherein said low-pass filter produces an output signal which is limited to a band of about one-half of said constant period of said input signal, and wherein said first and second high-pass filters produce output signals which are limited to bands of one-half or more of said constant period of said input signal.

3. The noise reduction circuit as defined in claim 1 or 2, wherein said input signal supplied at a constant period is formed by an MOS solid-state imaging device.

4. A noise reduction circuit, comprising a first low-pass filter connected to receive a periodic input signal through a circuit consisting of a delay circuit for delaying signal for a predetermined time within a constant period of said input signal to produce a delay signal and an addition circuit for adding said input signal and said delay signal or said input signal; a second low-pass filter connected to received said input signal and having a cut-off frequency corresponding to the constant period; a first high-pass filter connected to receive an output signal of the second low-pass filter for passing it through a band of about half or more of said constant period; an integrating circuit connected to receive an output signal of said first high-pass filter for integrating said input signal for one constant period; a second high-pass filter connected to receive an output signal of the integrating circuit; and an output addition circuit for adding an output signal of said first low-pass filter and an output signal of the second high-pass filter to form an output signal from which noise has been eliminated.

5. The noise reduction circuit as defined in claim 4, wherein said first low-pass filter forms an output signal which is limited to a band of about one-half or less of said constant period.

6. The noise reduction circuit as defined in claim 4 or 5, wherein said input signal supplied at constant period is formed by an MOS solid-state imaging device.

* * * * *